(12) United States Patent
Zhang

(10) Patent No.: US 7,386,217 B2
(45) Date of Patent: Jun. 10, 2008

(54) INDEXING VIDEO BY DETECTING SPEECH AND MUSIC IN AUDIO

(75) Inventor: Tong Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1287 days.

(21) Appl. No.: 10/020,256

(22) Filed: Dec. 14, 2001

(65) Prior Publication Data

US 2003/0112265 A1 Jun. 19, 2003

(51) Int. Cl.
*H04N 5/91* (2006.01)
(52) U.S. Cl. ....................................................... 386/46
(58) Field of Classification Search ..................... 386/1, 386/4, 5, 39, 45, 46, 52, 68–70, 75, 95, 96, 386/104, 111, 125, 126; 369/27, 28, 30.07, 369/32, 83; 360/5, 13, 69, 71; 348/533, 348/554, 571, 699, 700, 907; 725/22, 240
See application file for complete search history.

(56) References Cited

U.S. PATENT DOCUMENTS

| | | | |
|---|---|---|---|
| 5,550,965 A | 8/1996 | Gabbe et al. ............... 395/154 |
| 5,619,566 A * | 4/1997 | Fogel ..................... 379/406.07 |
| 5,642,174 A | 6/1997 | Kazui et al. ................. 348/700 |
| 5,649,060 A | 7/1997 | Ellozy et al. ............... 395/2.87 |
| 5,822,024 A * | 10/1998 | Setogawa et al. ......... 348/425.1 |
| 5,828,809 A * | 10/1998 | Chang et al. .................. 386/69 |
| 6,072,542 A | 6/2000 | Wilcox et al. .............. 348/722 |
| 6,094,234 A * | 7/2000 | Nonomura et al. ......... 348/700 |
| 6,347,114 B1 * | 2/2002 | Blanchard .................... 375/240 |
| 6,449,021 B1 * | 9/2002 | Ohta et al. .................. 348/700 |
| 6,763,510 B2 * | 7/2004 | Tanaka ........................ 716/11 |
| 6,973,256 B1 * | 12/2005 | Dagtas ........................ 386/46 |
| 2005/0020223 A1 * | 1/2005 | Ellis et al. ............... 455/186.1 |

FOREIGN PATENT DOCUMENTS

WO WO 01/33863 5/2001

* cited by examiner

*Primary Examiner*—Thai Tran
*Assistant Examiner*—Mishawn Dunn

(57) ABSTRACT

A video processing device includes an audio event detector and a memory that stores video data and audio data corresponding to the video data. The audio event detector detects an audio event in the audio data and indexes the video data at about a beginning of the audio event.

33 Claims, 11 Drawing Sheets

INDEXING VIDEO BY DETECTING SPEECH AND MUSIC IN AUDIO

FIELD OF THE INVENTION

The present invention relates generally to indexing video, and more particularly to indexing video by detecting audio events.

BACKGROUND OF THE INVENTION

Video devices are any type of device used to capture, store, process or play back video. Video devices generally work with a video captured by some manner of video recording device, such as a video camera. A video recording device may be used to record video of persons, events, scenes, etc. In addition, some video recording devices may be capable of adding effects directly into the video.

Many video processing devices exist that cannot record video but are capable of storing and/or processing it. One example is a video editor device. Home computers, when configured with video processing software, may be able to store and process digital video data, including processing operations such as editing, adding effects, trimming, etc. The processed video may then be electronically transferred to other devices or played back to users. Another type of video processing device may be a playback device such as a VCR or a DVD player that displays videos to a user.

Video recording devices have become very popular, especially for home use. As they become cheaper they have become increasingly widespread. As a result, many non-professional videographers are capturing videos.

Most video tapes contain multiple video scenes. A video scene may be defined as a continuous portion of video having a common subject over a contiguous period of time and in the same or contiguous space. A scene therefore contains a story or at least contains an independent semantic meaning.

Each video scene typically comprises one or more video shots. Each shot is a video segment captured from a record button press to a stop button press, i.e., a shot is a continuous capture period.

Captured video may be processed at a later time. The processing may be performed for various reasons, including imposing some form of organization that is useful for viewing. The processing therefore may include segmenting the video, such as by inserting indexes into the video. The segmenting is done so that particular video scenes or video shots may be easily found. In addition, the segmenting may enable a person to later determine what is stored on a particular tape.

The problem with most video recordings is that they are typically captured to magnetic tape. Magnetic tape is heavily used for video recording because it is widely available and can store large quantities of video. Magnetic tapes are also cheap and easy to use, with one exception. The exception is that videographers end up with many different scenes captured on a single tape, and may accumulate many tapes. Therefore, video segmenting and indexing becomes a large, complicated, and time-consuming task. The same problem exists for other types of storage media as well, such as solid-state memory, memory disc, optical memory, etc.

The prior art has approached the video indexing and segmenting problem in several ways. In a first prior art approach the photographer (or other user) must manually fast-forward or rewind through a tape in order to find a particular video shot or scene. Moreover, the user may occasionally have to pause to play the tape in order to see if the desired scene has been found. The user may then still need to do additional fast-forwarding or rewinding once the shot or scene has been found in order to find the beginning of the shot or scene. Then the video indexing or segmenting can be performed. This manual searching process may need to be done many times per tape.

The first prior art approach therefore has many drawbacks. Finding a particular video scene may be very difficult and very time consuming. This difficulty will be greater if the user is searching for a shot or scene that is relatively short (i.e., it will be harder to locate the desired video scene by fast-forwarding or rewinding). The problem is compounded when the user must find multiple scenes and therefore must move backwards and forwards many times in a recorded video.

In a second prior art approach, professional video segmenting systems have been developed (such as part of a professional video editing system). However, these prior art video segmenting systems are focused on professionally produced video. They typically feature specialized expensive equipment and operate on recorded audio that is unlike audio data captured within a home video tape. The professional video segmenting systems of the prior art operate on audio that is generally separately captured and tightly controlled during capture, such as in a studio environment. The prior art video segmenting systems typically segment video wherein the audio component has been subjected to processing, such as filtering and noise control, regulation of the captured audio level, etc.

One drawback to the second prior art approach is that such professional video editing/segmenting systems are expensive and are designed for highly processed audio. Furthermore, the prior art professional video approach may not work satisfactorily on home audio that has varying capture levels and large amounts of background noise.

Another drawback is that the segmenting and indexing of the prior art professional approach operates through shot detection. The prior art professional segmenting approach analyzes video frames, separates the video into shots, and extracts one or more frames from each shot to represent it. The prior art video indexing and segmenting therefore cannot segment video into semantically meaningful video scenes, and is only capable of indexing and segmenting individual shots. This kind of indexing lacks semantic meaning because one scene or story may contain many shots, and there is no way to decide what shots are within one story. As a result, there may be too many index frames within a video tape or video file. As a result, the user cannot easily browse and retrieve the video segments.

Therefore, there remains a need in the art for improvements to video segmenting and indexing.

SUMMARY OF THE INVENTION

A video processing device comprises an audio event detector and a memory that stores video data and audio data corresponding to the video data. The audio event detector detects an audio event in the audio data and indexes the video data at about a beginning of the audio event.

DETAILED DESCRIPTION

Figure 1:
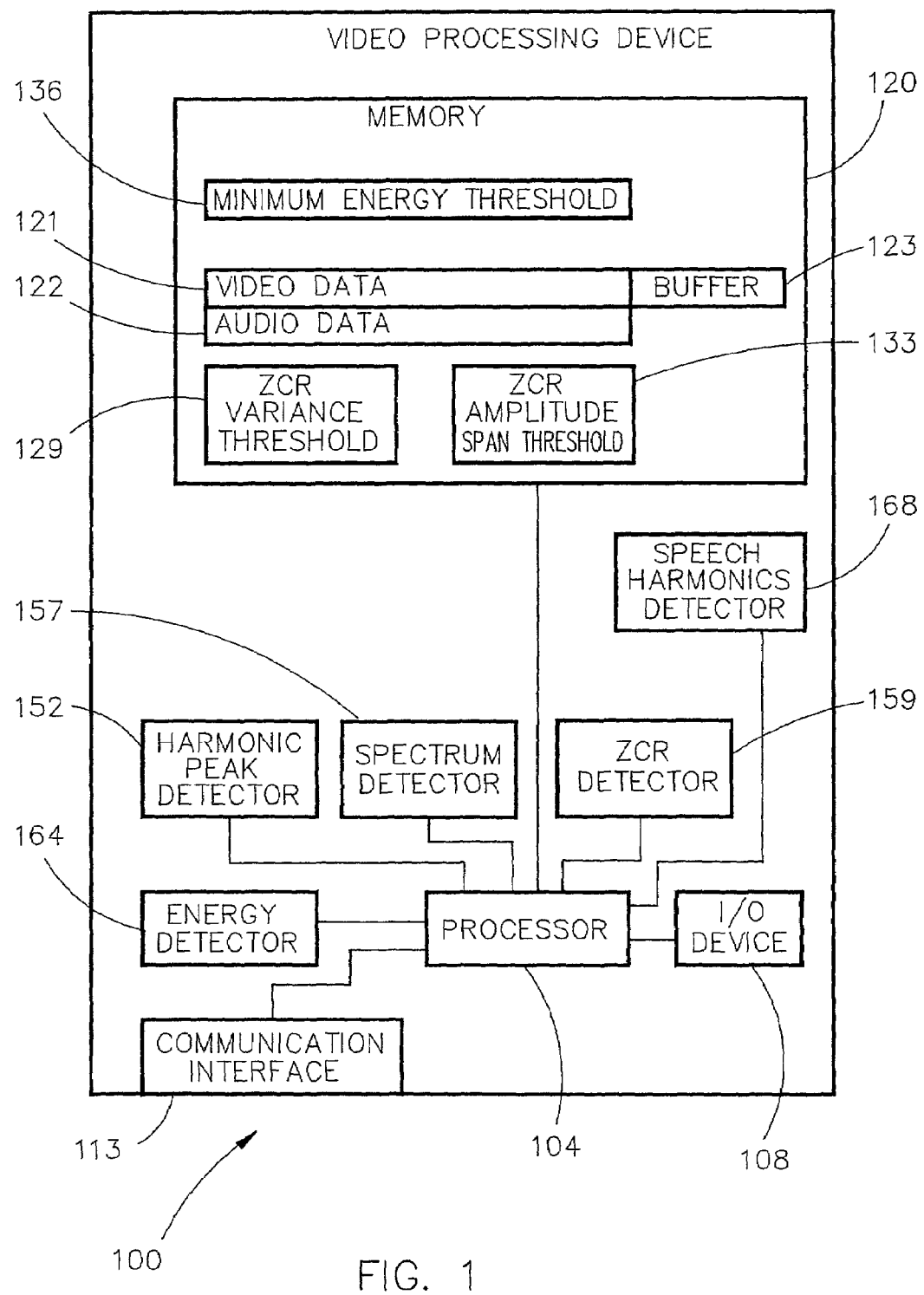
FIG. 1 is a schematic of a video processing device according to one embodiment of the invention.

FIG. 1 is a schematic of a video processing device 100 according to one embodiment of the invention. The video processing device 100 may be any type of electronic device capable of processing video data, including video recorder devices, video editor devices, video authoring devices, and combinations thereof. The video processing device 100 therefore may be a digital or analog video camera, a computer configured by video processing software, a dedicated video processing device, a video playback device such as a video cassette recorder (VCR), a digital video disc (DVD) player for writable DVD discs, a home entertainment center, etc.

The video processing device 100 may include a processor 104, at least one input/output (I/O) device 108, a communication interface 113, a memory 120, a harmonic peak detector 152, a spectrum detector 157, a zero-crossing rate (ZCR) detector 159, an energy detector 164, and a speech harmonics detector 168.

The processor 104 may be any type of general purpose processor. The processor 104 executes a control routine contained in the memory 120. In addition, the processor 104 receives user input and conducts the overall operation of the video processing device 100.

The at least one I/O device 108 may be any type of input and/or output device. The at least one I/O device 108 may include a set of input function buttons (such as on a video camera), a keyboard, a mouse or other pointing device, a display (including CRT or LCD displays), a touch screen, a remote control, etc. The at least one I/O device 108 may be used to accept input commands and make selections from among operations available for the video processing device 100. The at least one I/O device 108 may additionally be used to receive information from the video processing device 100 and view video segments or video frames.

The communication interface 113 may be any type of communication interface, including a universal serial bus (USB) port, a wireless communication transceiver, a network card for a computer network, a modem for digital communication over a telephone line, a FIREWIRE card, etc. The communication interface 113 allows the video processing device 100 to transmit and receive digital data, including digital video data.

The memory 120 may be any type of digital memory. The memory 120 may store, among other things, video data 121, audio data 122, a predetermined zero-crossing rate (ZCR) variance threshold 129, a predetermined ZCR amplitude span threshold 133, and a predetermined minimum energy threshold 136. In addition, the memory 120 may include a buffer 123 and may store software or firmware to be executed by the processor 104.

The video data 121 is digital video data and may be stored in a random access memory (RAM). Alternatively, the video data 121 may be a storage of the video data in any type of storage medium, such as on a magnetic tape, or may be a copy of video data obtained from a tape or disc storage medium. The video data 121 may be read out of the memory 120 and processed by the video processing device 100.

The audio data 122 is the audio complement of the video data and may be stored in parallel with the video data 121. Alternatively, the audio may be multiplexed with the video data 121 and may require de-multiplexing into video data and audio data before the video segmenting can be performed.

The predetermined ZCR variance threshold 129 is a minimum ZCR variance value. The ZCR is a measure of the number of times (in a sample) that the amplitude of the speech signal passes through zero. A ZCR for speech displays a recognizable set of characteristics and therefore may be used for speech detection. The predetermined ZCR variance threshold 129 therefore reflects how much the ZCR value must vary (between points in time or between samples) for the audio data to comprise speech.

The predetermined ZCR amplitude span threshold 133 stores a ZCR amplitude value span that is the distance between the highest ZCR value and the lowest ZCR value. If the ZCR value span exceeds the predetermined ZCR amplitude span threshold 133 and if a computed ZCR variance for the audio data exceeds the predetermined ZCR variance threshold 129, then speech is likely to be occurring.

The predetermined minimum energy threshold 136 stores a predetermined minimum energy value. The audio data must contain more audio energy than the predetermined minimum energy threshold 136 before a music or speech detection may occur. This is to ensure that low-level speech or music is not used for segmenting and indexing, or that noise does not trigger the segmenting and indexing.

An audio event detector according to the invention may be formed of one of several embodiments. In a first embodiment the audio event detector is a speech segment detector and may comprise the energy detector 164, the ZCR detector 159, the spectrum detector 157, and the speech harmonics detector 168. In a second audio event detector embodiment, the audio event detector is a music segment detector and may comprise the energy detector 164, the spectrum detector 157, and the harmonic peak detector 152. It should be understood that the audio event detector may be implemented as a custom audio chip, in a digital signal processor (DSP), as a software routine operating on digital audio values, etc.

The energy detector 164 measures the energy content of the audio data and provides an energy content output. This energy content output may be compared to the predetermined minimum energy threshold 136.

The ZCR detector 159 receives the audio data and provides an average ZCR value that reflects the average number of zero crossings in the audio data per audio frame. This ZCR value may be compared to the predetermined ZCR variance threshold 129 and to the predetermined ZCR amplitude span threshold 133.

The spectrum detector 157 converts audio data in the time domain into a frequency spectrum output. The spectrum detector 157 therefore may perform a frequency transform on the digital audio data. The spectrum detector 157 may implement a fast Fourier transform (FFT), for example. The output may be a time sample of the audio data in the form of a frame, wherein the frequency spectrum output is periodically generated.

The contents of the frequency spectrum may be obtained in several ways. In one embodiment, the video processing device 100 may use a sliding window that obtains a predetermined number of sampling points from the audio data. The window is used to obtain a frame of audio samples for computing energy, ZCR values, and frequency spectrums. The window may be about 10 to about 50 milliseconds long, for example, although other window lengths may be used. The window may then be moved, such as by sliding the window about 10 milliseconds, for example, and the procedure may be repeated. It is assumed that samples within this window length do not exhibit much variation and have stable features. Neighboring windows overlap so that there is no sudden change between windows.

The harmonic peak detector 152 receives a frequency spectrum output from the spectrum detector 157 and detects significant frequency peaks therein. A significant frequency peak may be defined as any frequency peak having an amplitude greater than a predetermined peak amplitude threshold, having a peak width within a predetermined peak width range, and having a sharpness of the peak within a predetermined peak sharpness range. These values for the peaks may be empirically determined and may depend on the spectrum computation method and the length of the FFT sample time. The speech harmonic thresholds may be stored in the memory 120, while the rules may be expressed as routines in the harmonic peak detector 152.

The output of the harmonic peak detector 152 may be a plurality of amplitude values corresponding to a plurality of audio frequency bands. It should be noted that the harmonic peak detector 152 may be a postprocessor for the spectrum detector 157, or alternatively may be integrated into the spectrum detector 157.

The speech harmonics detector 168 detects speech harmonics in frequency spectra generated by the spectrum detector 157. The speech harmonics detector 168 compares a spectrum to a set of predetermined speech harmonics rules and thresholds and generates a speech detect output if the spectrum contains a speech fundamental frequency and harmonics thereof (see FIG. 3 below and accompanying discussion).

It should be noted that although the harmonic peak detector 152, the spectrum detector 157, the ZCR detector 159, the energy detector 164, and the speech harmonics detector 168 are shown as hardware blocks, they could alternatively be implemented in a digital software processing routine operating on digital audio waveform values. In addition, the detectors may be implemented as custom audio chips or in a digital signal processor (DSP), for example.

In operation, the processor 104 receives the video data and the audio data. The video and audio data may be derived from a common source, such as a magnetic video tape. Therefore, the video processing device 100 may need to de-multiplex the video and audio. Alternatively, they may be separately received in a concurrent manner.

The input to the system may be a video from a video recorder, with the video being processed in real-time, according to the invention. The video stream therefore may be received through any manner of communication device, such as the communication interface 113, for example. Alternatively, the video may be already recorded to some form of storage medium and may be obtained from the storage medium.

The processor 104 processes the audio and detects audio events in the audio data. The audio events may then be used for indexing the video data. The audio events may be detected in several ways (see FIG. 2 and accompanying text). In a first audio event detection embodiment, speech is detected by comparing frequency components of the audio to a predetermined set of harmonics rules and harmonics thresholds (see FIG. 3 below and accompanying text). In a second audio event detection embodiment, music is detected in the audio data by comparing frequency peaks in two or more consecutive frequency spectra and detecting music if the frequency peaks are substantially stable (see FIG. 4 below and accompanying discussion).

The processor 104 may use detected audio events to index the video data. The invention is capable of indexing portions of the video data, including at the beginning of semantically meaningful scenes. The indexing may include the insertion of indexes into the video data, may include storing of pointers to the beginning of video segments, may include the independent storing of each video segment, or may be the extraction of one or more representative video frames from the video. Because the audio event detection of the invention includes speech detection and music detection, an index may be created whenever the beginning of speech or music is detected. The user may thereafter access desired video scenes or video shots. By using such indexes, the user may quickly ascertain which scenes are in a stored video data and may easily access them. As a result, the indexing enables easy and efficient browsing and/or editing of the indexed video data.

In addition, the speech or music detection may be used to determine whether the audio data comprises foreground or background audio. One method of foreground/background determination is discussed in the co-pending patent application Ser. No. 10/020,255 to the same inventor, and is incorporated herein by reference. However, other suitable methods may be employed. This determination may be used to segment the video data. Therefore, the speech or music detection of the invention may also be used for segmenting the video data, and may further be used for segmenting the video data into semantically meaningful scenes.

Figure 2:
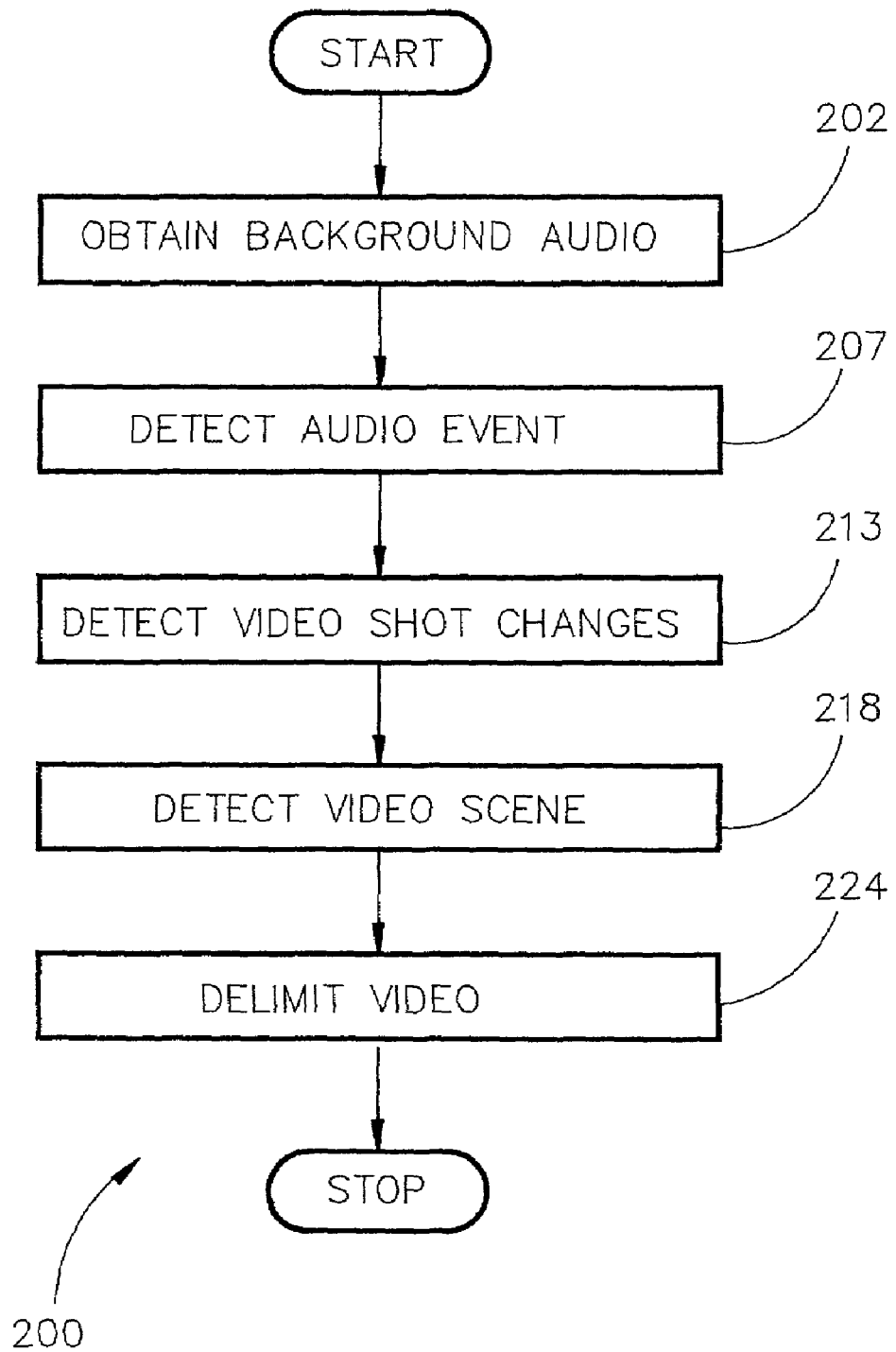
FIG. 2 is a flowchart of a method of indexing video data according to another embodiment of the invention.

FIG. 2 is a flowchart 200 of a method of indexing video data according to another embodiment of the invention. In step 202, the background audio is obtained. This may include de-multiplexing a video stream to produce video data and audio data.

In step 207, an audio event is detected. As previously discussed, this may be done in several ways. In a first audio event detection embodiment, the energy content and ZCR values for the audio data are obtained and compared to predetermined thresholds. If the energy and ZCR exceed these predetermined thresholds, harmonic components of the audio data are obtained from a frequency spectrum of the audio data. If the audio data contains speech harmonic components, speech is detected (see FIG. 3, FIGS. 5-8, and accompanying discussion). If this is the first occurrence (i.e., a start) of speech, then an audio event and video scene change may be detected. If this is a first occurrence of non-speech (i.e., speech stops), then again an audio event and video scene change may be detected.

Alternatively, in a second audio event detection embodiment, the energy is again obtained. If the energy is above the predetermined minimum energy threshold 136, frequency spectrums are obtained. If substantially stable frequency peaks exist in the spectrums, then music is detected (see FIG. 4, FIGS. 13-16, and accompanying discussion). If this is the first or last occurrence (i.e., a start or stop) of music, an audio event and video scene change may be detected.

In step 213, video shot changes may optionally be detected. The video shot changes may be detected by analyzing video frame differences, as is known in the art, and may provide additional information when segmenting the video data.

In step 218, a video scene in the video data may optionally be detected. The video scene may be detected using a detected background audio change, as discussed in the co-pending patent application Ser. No.10/020,255 to the same inventor, and is incorporated herein by reference. Alternatively, the video scene may be detected using the detected video shot changes or using the detected background audio change in conjunction with detected video shot changes.

Shot changes and audio events are detected in the video data and the audio data, respectively. When a shot change and an audio event occur substantially simultaneously, a scene change is defined. The precise location of the scene change is at the video frame where the shot change occurs.

In step 224, a video shot or scene may optionally be delimited. This may be done in various ways. In a first embodiment, the delimiting may be performed by inserting index data into the video data at the beginning of each semantically meaningful video scene, in order to make the scene easy to find.

In another embodiment, the delimiting may comprise saving a set of index pointers, where each index pointer value is an address of a first video frame of a video scene. Through such an index pointer, the user may be able to go to the beginning of a particular scene or may be able to scan from scene to scene until the user finds the desired scene. The user therefore may browse the video data by using indexes.

In yet another alternative embodiment, the delimiting operation may comprise extracting one or more representative video frame indexes from each video segment or scene. The user may browse through a collection of such representative video frame indexes in order to find a desired video scene. The first video frame of a scene or shot may be an index and may take the user to the beginning of the corresponding scene, if it is selected. For example, the extracted index frames may include a link to corresponding positions in the video data or storage medium (such as a pointer address). Such a link may allow a user to select a particular index video frame and go directly to that video frame in the video data.

There are various ways of extracting index frames from a video scene. For example, one or more frames can be selected from a scene. The first frame may be selected or a middle or last frame may be selected. Alternatively, the video processing device 100 may choose frames at predetermined time periods. In another alternative embodiment, the video processing device 100 may choose index frames in an intelligent way, i.e., it may choose the most proper frames to best represent content of the scene by using predetermined index selection rules or algorithms. Alternatively, the user may interact with the video processing device 100 in choosing representative video frames.

In another alternative, the delimiting operation may include a recordation of an indexing time stamp or similar counter value corresponding to the beginning of each video scene. Each video data may then be modified with a library of such segmenting and/or indexing time stamps.

The various types of audio event detection described above may be iteratively performed in order to segment an entire video. In addition, the various types of audio event detection may be performed in combination to increase the reliability of the background change detection. The method may therefore segment video data into a series of semantically meaningful video scenes.

The audio event detection may additionally include detection of transients in the audio, i.e., clicks or pops. Such transients may be first detected so that they will not interfere with the detection of audio events. Clicks or pops may be detected by their volume and duration, as they are essentially sharp spikes which are high in volume but short in duration.

Figure 3:
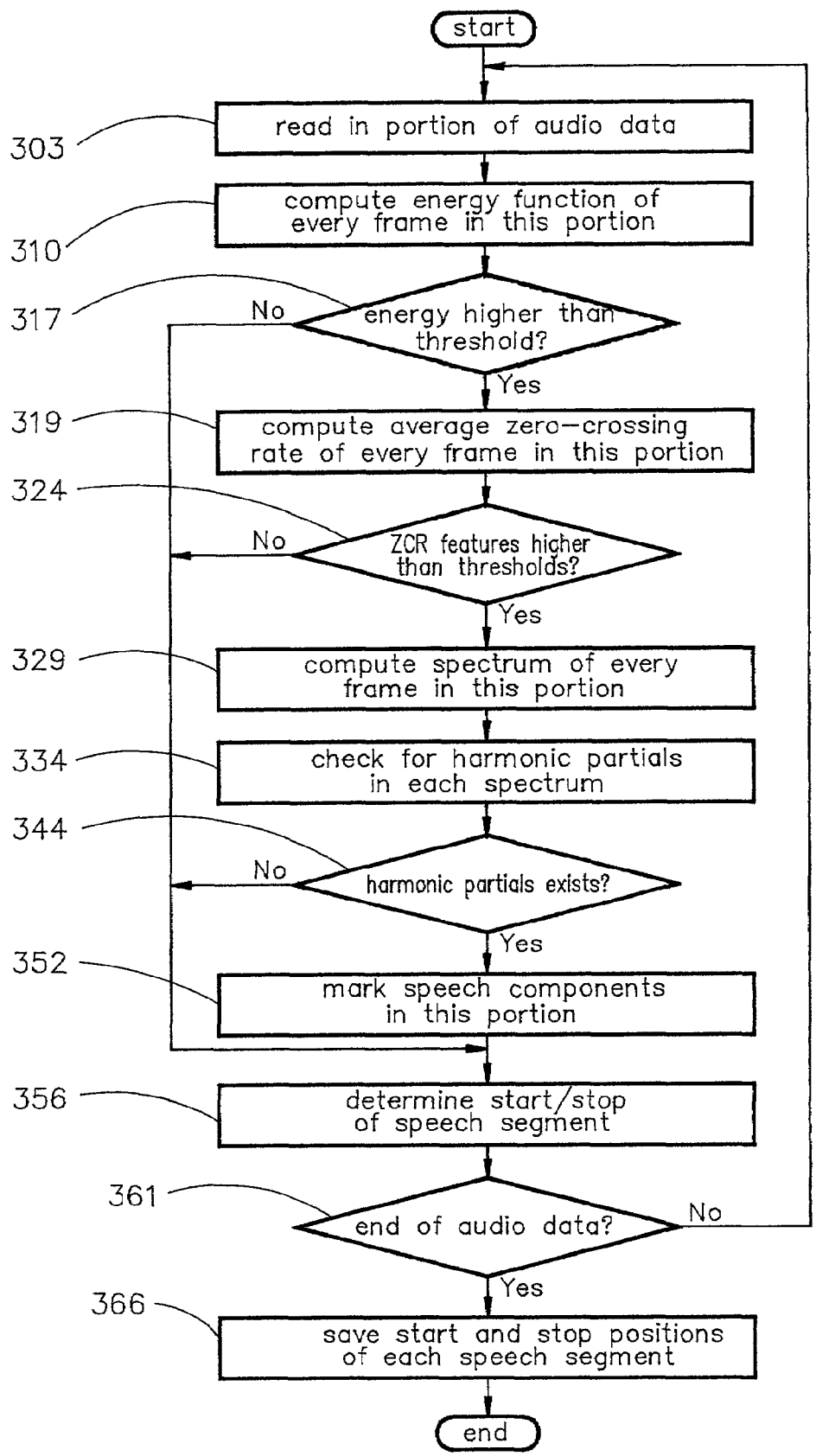
FIG. 3 is a flowchart of a speech audio event detection embodiment.

FIG. 3 is a flowchart 300 of a speech audio event detection embodiment. In step 303, a portion of audio data is obtained for processing. The portion may be read into the buffer 123, whether the video processing device 100 is performing on-line or off-line processing. The portion may be, for example, 1 or 2 seconds of audio data. Audio data in the buffer 123 may be divided into frames, using overlapping sampling windows. Each frame may be about 10 to 20 milliseconds long, for example.

In step 310, the energy function of the portion may be computed for each frame of audio data in the portion. The short-time energy value represents the average energy level of the frame. The short-time energy function E(n) for the audio frame therefore is computed and used to detect the energy in a particular audio frame. The short-time energy function E(n) is defined as:

$$E_n = (1/N) \sum_m [x(m)w(n-m)]^2 \qquad (1)$$

where x(m) is the discrete time (digitized) audio sample, m is the time index of the audio sample, n is the time index of the short-time energy, and w(m) is a rectangular window defined by:

$$w(m) = 1 \qquad 0 <= m <= N-1$$
$$\phantom{w(m) =\ } 0 \qquad \text{otherwise}$$

and where N is the length of the rectangular sampling window. By assuming that the audio signal changes relatively slowly within a small interval, $E_n$ may be computed about every 10 to 20 milliseconds. For example, if the sampling rate used to capture and digitize the audio data was a sampling rate of 8000 Hz, the energy function $E_n$ may be computed about every 100 audio samples.

In step 317, the computed energy values are compared to a predetermined minimum energy threshold 136. If all of the energy values are less than the predetermined minimum energy threshold 136, it is unlikely that this audio portion will contain speech components (voiced speech generally contains an energy higher than the predetermined minimum energy threshold 136). Consequently, if there are energy values which are greater than the predetermined minimum energy threshold 136, the method proceeds to step 319; otherwise it branches to step 356.

In step 319, an average ZCR value is computed for each frame of audio in the audio portion. In the context of discrete time (digitized) audio, a zero-crossing is said to occur if successive samples have different signs. The zero-crossing rate therefore is a simple measure of the frequency content of a signal. The short-time average ZCR for an audio frame is defined as:

$$Z_n = (1/2)\sum_m \{[sgn[x(m)] - sgn[x(m-1)]\}w(n-m) \qquad (2)$$

where:

$$sgn[x(m)] = 1 \quad x(m) >= 0$$
$$\qquad\qquad\;\; -1 \quad x(m) < 0$$

and $$w(m) = 1 \quad 0 <= m <= N-1$$
$$\qquad\;\; 0 \quad \text{otherwise}$$

Again, N is the length of the rectangular window w(m). As is done for the energy function, $Z_n$ is likewise computed about every 10 to 20 milliseconds.

The speech production model is a model of the physical process of generating speech. The speech production model is discussed in *Digital Processing of Speech Signals*, by L. Rabiner and R. Schafer, Prentice-Hall Inc., New Jersey, 1978, incorporated herein by reference. The speech production model suggests that the energy of voiced speech signals is concentrated below 3 kHz because of the spectral fall-off introduced by the glottal wave, whereas most of the energy is found at higher frequencies for unvoiced speech signals. Since ZCR is a measure of the frequency level, voiced speech components have lower ZCR values while unvoiced speech components have higher ZCR values. Voiced and unvoiced speech components are interleaved with each other in a speech signal, thus the ZCR of speech has a much higher variance and amplitude span than a ZCR value of some other audio data, such as music.

The variance of ZCR values may be computed by dividing the audio portion into smaller segments and the variance in each segment may be computed. Similarly, the amplitude span of ZCR values in the portion (or shorter segments within the portion) is computed. The ZCR amplitude span is defined as the distance between the highest ZCR value and the lowest ZCR value in the portion or segment. If the variance or span of amplitude values are lower than the predetermined ZCR variance threshold 129 and the predetermined ZCR amplitude span threshold 133, respectively, it is unlikely that the portion contains speech components.

In step 324, the computed average ZCR value is compared to the predetermined ZCR amplitude span threshold 133 and the predetermined ZCR variance threshold 129. If the computed average ZCR value span exceeds the predetermined ZCR amplitude span threshold 133 and if a computed ZCR variance for the audio data exceeds the predetermined ZCR variance threshold 129, then the method proceeds to step 329; otherwise it branches to step 356.

In step 329, the spectrum of each audio frame is computed. There are various ways of obtaining spectrum. One way is to apply a fast Fourier transform (FFT) to an audio frame. However, other spectrum production methods may be used, such as to obtain a smoother version of the spectrum or to obtain a spectrum in which it is easier to detect frequency peaks.

In step 334, harmonic partials are detected in each spectrum by picking significant peaks in the spectrum (i.e., peaks having an amplitude, width and sharpness in predetermined ranges). The peaks are checked for harmonic speech relations, i.e., the frequencies of the peaks should be integer multiples of a common, fundamental frequency (the fundamental frequency of human voice is about 100 to 300 Hz). Harmonic speech signals have peaks at the fundamental frequency and may further contain integer multiples of the fundamental frequency (see FIG. 7 below and accompanying discussion). The harmonic speech partials may be detected by the harmonic peak detector 152.

Voiced speech components (vowels) and unvoiced speech components (consonants) are interleaved with each other in a speech signal. Therefore, in terms of a temporal pattern, speech may include harmonic partials in a number of consecutive audio frames, with fundamental frequency values being the same or changing gradually. Thus, harmonic partials exist for a number of consecutive audio frames in voiced speech, disappear during unvoiced speech, and appear again in the next voiced speech. This distinguishing temporal pattern is typical of speech. If this pattern exists in the audio data, then there is speech in the audio.

In step 344, if harmonic partials exist in the audio portion, the method proceeds to step 352; otherwise it branches to step 356.

In step 352, the detected speech components in the audio portion are marked. Therefore, a temporal range in the portion containing speech is determined. The range may cover part or all of the audio portion.

In step 356, the audio portion is analyzed in order to determine whether a speech start or stop has occurred. However, if the energy level or the ZCR level of the audio portion is too low, no speech can be determined in the portion, and the method proceeds to analyze the next audio portion (i.e., the current audio portion is not processed for speech if it does not contain a significant energy and ZCR variance levels).

This step may include not only analyzing a particular current audio portion, but also may include analyzing neighboring audio portions, as a speech segment may consist of multiple audio portions. By merging detection results for neighboring audio portions, the start and stop of a speech segment are optimally determined.

Optionally, any speech segments shorter than a predetermined duration (e.g., 1 or 2 seconds, for example) may be ignored. This may be done because small speech segments may not contain any significant semantic meaning or may be false alarms.

In step 361, the method checks for an end of the audio data. If it is not the end, the method branches back to step 303 and more audio data is processed; otherwise the method proceeds to step 366.

In step 366, the start and stop positions of each detected speech segment may be saved or marked in some manner. The start and stop positions may be used to segment the video data.

Figure 4:
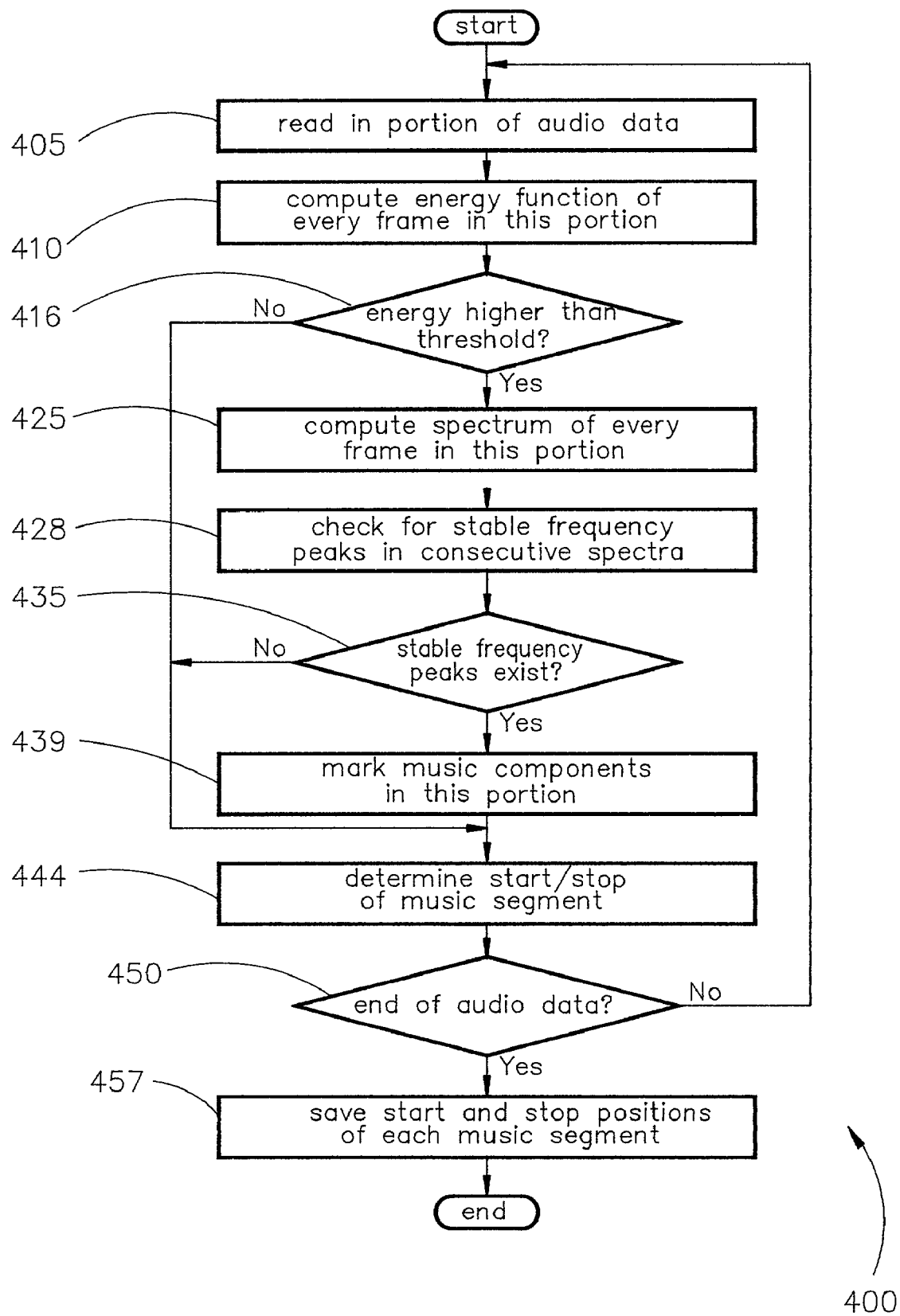
FIG. 4 is a flowchart of a music audio event detection embodiment.

FIG. 4 is a flowchart 400 of a music audio event detection embodiment. In step 405, a portion of audio data is obtained for processing. The portion may be read into a buffer 123, whether the video processing device 100 is performing on-line or off-line processing. The portion may be, for example, 1 or 2 seconds of audio data. Audio data in the buffer 123 may be divided into frames, using overlapping sampling windows. Each frame may be about 10 to 20 milliseconds long, for example.

In step 410, the energy function of the portion may be computed for each frame of audio data in the portion, as previously discussed in step 310.

In step 416, the computed energy values are compared to the predetermined minimum energy threshold 136. If all of the energy values are less than the predetermined minimum energy threshold 136, it is unlikely that this audio portion will contain music components. Consequently, if there are energy values greater than the predetermined minimum energy threshold 136, the method proceeds to step 425; otherwise it branches to step 444.

In step 425, the spectrum of each audio frame is computed. There are various ways of obtaining spectrum. One way is to apply a fast Fourier transform (FFT) to an audio frame. However, other spectrum production methods may be used, such as to obtain a smoother version of the spectrum or to obtain a spectrum in which it is easier to detect frequency peaks.

In step 428, the method checks for stable frequency peaks in the spectra (preferably two or more consecutive spectra). Peaks in the whole audio frequency range may be checked. Alternatively, only peaks in a predetermined frequency range may be checked. For example, in order to avoid the influence of low-frequency noise, only peaks above a predetermined frequency value (such as a frequency value between 500 Hz to 1000 Hz, for example) may be checked.

The stable frequency peaks check is performed because notes played by musical instruments are reflected as stable frequency peaks in the spectrogram. That is, peaks at certain frequencies are present in a number of consecutive spectra. In each spectrum, significant peaks are picked. Significant peaks are peaks having an amplitude, width, and sharpness in predetermined ranges, with these ranges being empirically obtained and being dependent on the length of the FFT sample and how the spectrum is computed. Then, a mechanism is used for tracking frequencies of peaks in consecutive spectra (i.e., positions of peaks on the horizontal axis of the spectrum).

In step 435, if stable frequency peaks exist in the audio portion, the method proceeds to step 439; otherwise it branches to step 444.

In step 439, the detected music components in the audio portion are marked. Therefore, a temporal range in the portion containing music is determined. The range may cover part or all of the audio portion.

In step 444, the audio portion is analyzed in order to determine whether a music start or stop has occurred. However, if the energy levels of the audio portion are too low, no music can be determined in the portion, and the method proceeds to analyze the next audio portion (i.e., the current audio portion is not processed for music if it does not contain significant energy levels).

This step may include not only analyzing a particular current audio portion, but also may include analyzing neighboring audio portions, as a music segment may consist of multiple audio portions. By merging detection results for neighboring audio portions, the start and stop of a music segment are optimally determined.

In step 450, the method checks for an end of the audio data. If it is not the end, the method branches back to step 405 and more audio data is processed; otherwise the method proceeds to step 457.

In step 457, the start and stop positions of each detected music segment may be saved or marked in some manner. The start and stop positions may be used to segment the video data.

Figure 5:
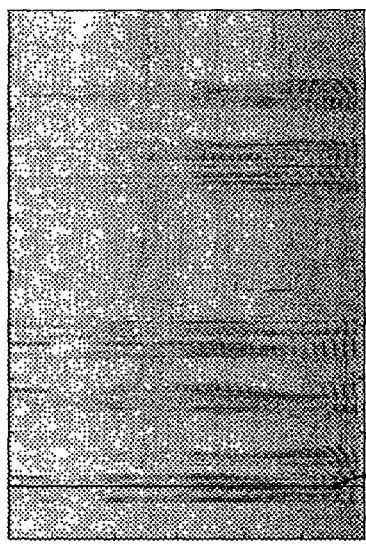
FIG. 5 is a time-domain waveform graph of a captured audio data.

FIG. 5 is a time-domain waveform graph of a captured audio data. The horizontal axis represents time and the vertical axis represents the amplitude of the audio data.

Figure 6:
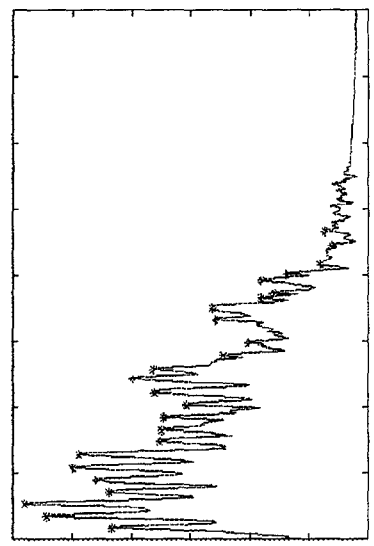
FIG. 6 is an energy function graph of the captured audio data of FIG. 5.

FIG. 6 is an energy function graph of the captured audio data of FIG. 5, where the horizontal axis represents time and the vertical axis represents a short-time energy of the audio data at that time. The energy level is examined because voiced speech segments and music should contain an energy level higher than the predetermined minimum energy threshold 136. By examining the energy level of the audio data, it can be determined whether speech or music detection should be performed. If the energy level of the audio data is too low, no audio event detection need be performed. This is true for all audio event detection embodiments. By first screening for adequate energy levels, the invention may reduce processing overhead and processing time, and therefore performs the audio event detection efficiently.

As part of the speech audio event detection embodiment, the detection method includes detecting zero-crossing rates in the audio data. If the energy content exceeds the predetermined minimum energy threshold 136, a ZCR value for the audio data is obtained and compared to the predetermined ZCR amplitude span threshold 133 and the predetermined ZCR variance threshold 129. If the ZCR value span exceeds the predetermined ZCR amplitude span threshold 133 and the variance within an audio portion or segment is above the predetermined ZCR variance threshold 129, then the speech detection proceeds (see FIG. 10 below and accompanying discussion).

Figure 7:
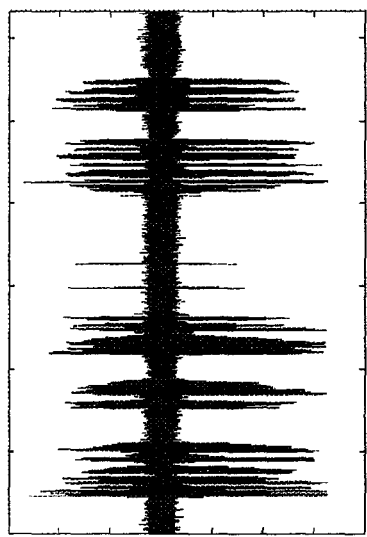
FIG. 7 is a spectrogram of the captured audio data of FIG. 5.

FIG. 7 is a spectrogram (i.e., a frequency plot) of the captured audio data of FIG. 5, wherein frequency components of the audio are represented by pixel intensities. The horizontal axis again denotes time and the vertical axis denotes frequency. Therefore, for any given point in time, the spectrogram shows all frequency components present in an instant of the audio.

The frequency components in the spectrogram may be determined by inspecting a vertical line originating at the desired point in the horizontal (time) axis. Low frequency components will be shown as dark points at the bottom region of this vertical line. High frequency components are seen as dark points at the top region of the vertical line. White points indicate no frequency component for that frequency at the designated moment in time. Darker pixel elements of the spectrogram reflect a greater frequency content at that point.

A speech signal consists of voiced components and unvoiced components. Voiced components are vowels and unvoiced components are consonants in speech. The voiced components contain frequency harmonics, which are indicated by harmonic partials in the frequency domain. A harmonic is a waveform component having a frequency that is some integral multiple of a fundamental waveform component/frequency. Unvoiced components are non-harmonic. The harmonic components of speech can be observed as substantial lines in the spectrogram. The lines may be generally horizontal, but may also include some slope and/or some small peaks and valleys (due to pitch changes during speech, even within a single phoneme). The point A in the speech segment may be chosen and the spectrum at that point may be computed (see FIG. 8 below).

Figure 8:
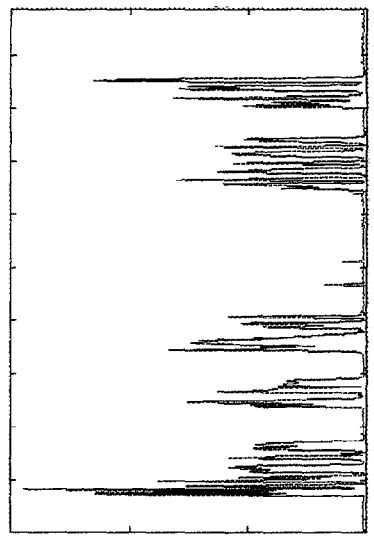
FIG. 8 is a spectrum computed for the waveform of FIG. 5 at point A.

FIG. 8 is a spectrum computed for the waveform of FIG. 5 at point A. In the spectrum, the horizontal axis denotes frequency and the vertical axis denotes amplitude. The stars represent significant peaks, detected by a peak picking algorithm. It can be seen that in the lower to mid-frequency range, there exist periodic peaks which are harmonic partials in the speech signal. Therefore, by computing a spectrum over a predetermined time window (such as 10-20 milliseconds of the audio data) and then searching for harmonic peaks in the spectrum, harmonic components in the speech can be detected.

These speech harmonic components are generally different from harmonic components in other types of audio, such as music. The harmonic components in speech are interleaved with non-harmonic sound, ie., the unvoiced speech components. Algorithms exist for detecting harmonic partials in the spectrum despite a high noise level, i.e., they can recognize the spectral pattern of voiced speech and distinguish the temporal pattern of speech regardless of the noise level.

Since computing the spectrum may require an N-point fast Fourier transform (with N typically being 512 or 1,024 data points), in order to make the procedure faster, it is more efficient to first screen out those segments of audio which are unlikely to contain speech. To do this, the short-time energy function and short-time average ZCR of the audio data are computed.

Figure 9:
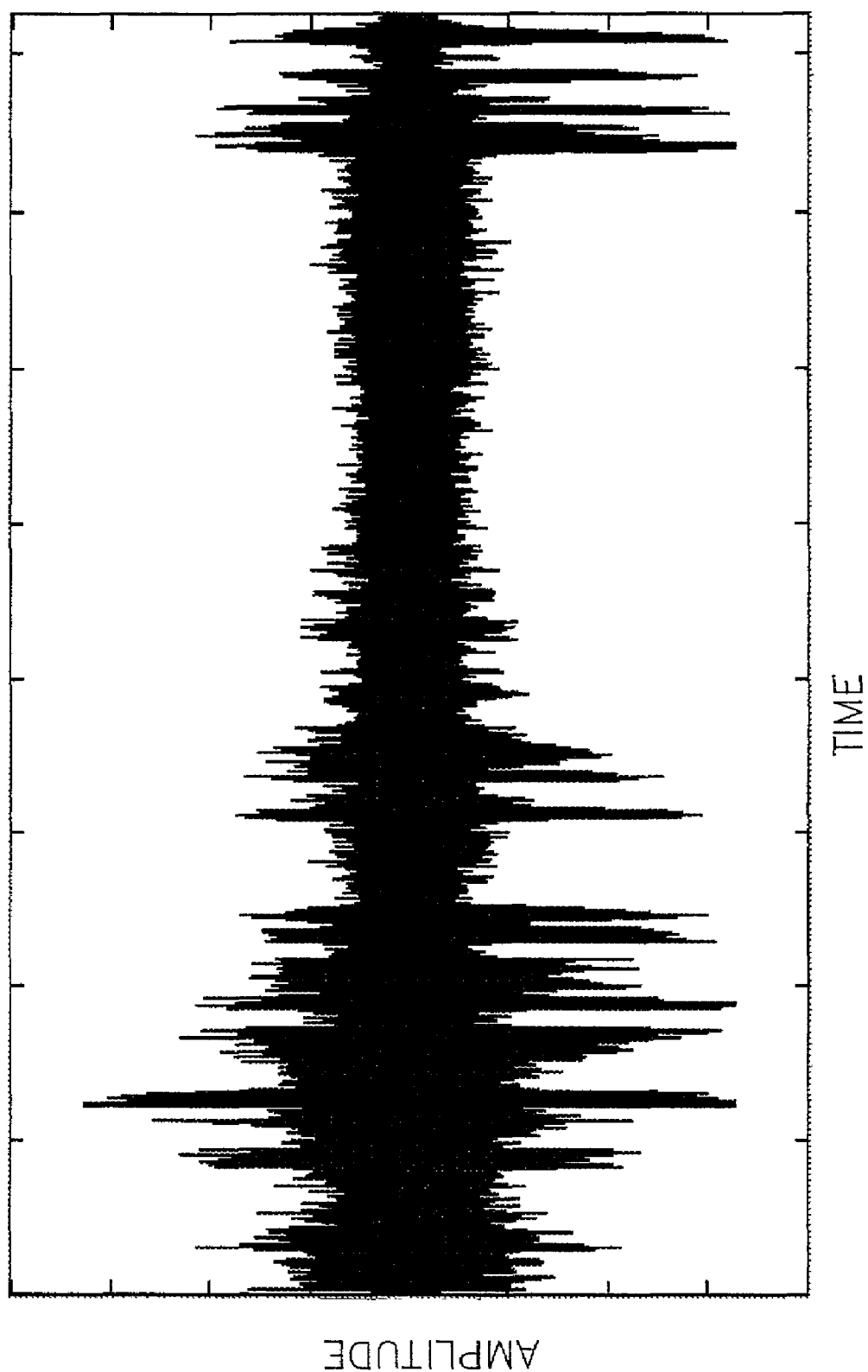
FIG. 9 is a time-domain waveform graph of another captured audio data.

FIG. 9 is a time-domain waveform graph of another captured audio data. In the first portion of the graph, the audio waveform contains strong noise (the sound of a car with sudden braking), which is followed by speech. As the noise level is quite high, the energy level in this portion of the graph is also high (see FIG. 10 below).

Figure 10:
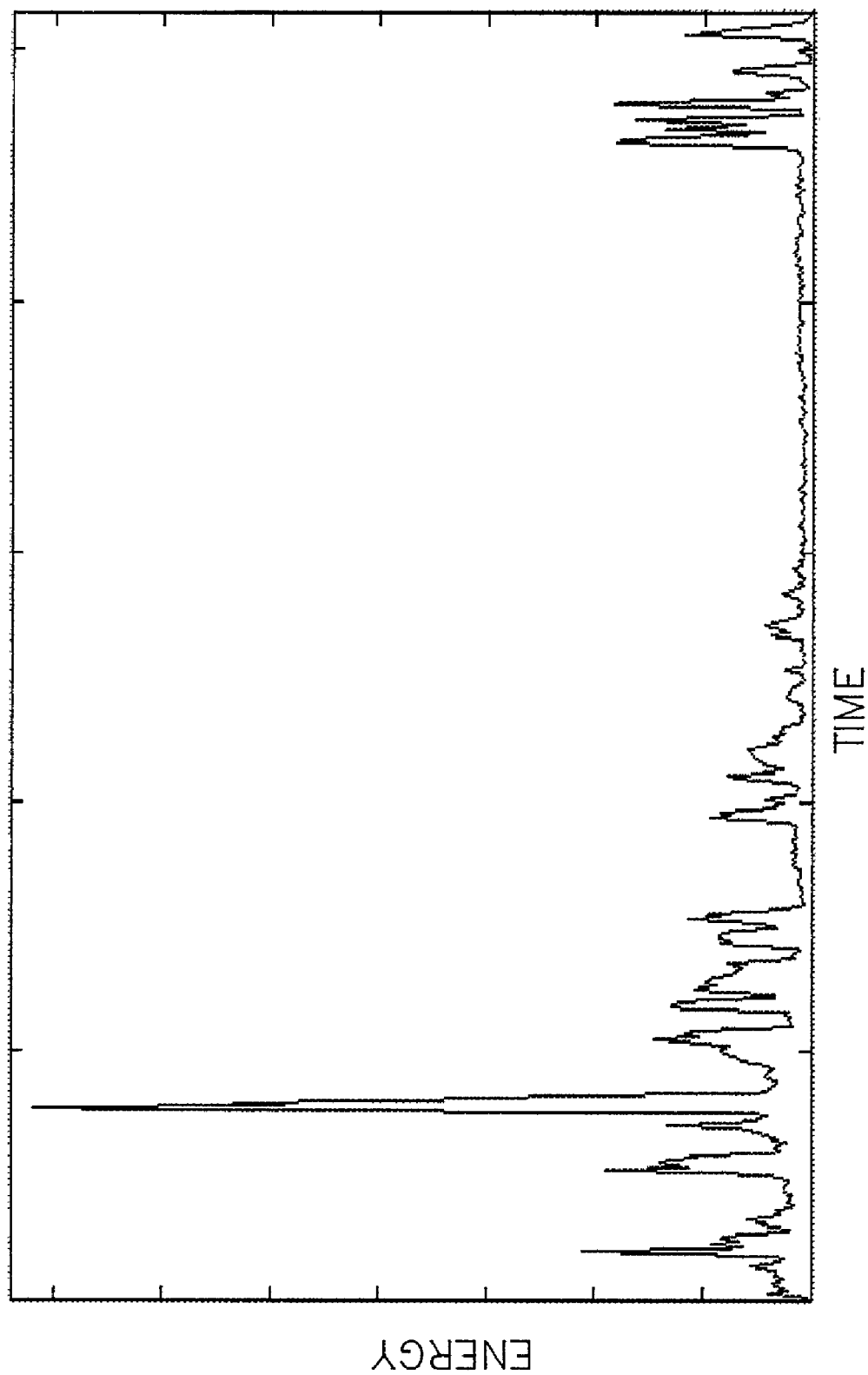
FIG. 10 is an energy function graph of the captured audio data of FIG. 9.

FIG. 10 is an energy function graph of the captured audio data of FIG. 9. This figure shows that the energy level of the audio waveform for both the noise and the speech may likely exceed a speech energy threshold. Therefore, both the noise and the speech will need to be processed, and the noise must be rejected by the speech detection process. The predetermined minimum energy threshold 136 therefore only rejects some of the non-speech audio in this example.

Figure 11:
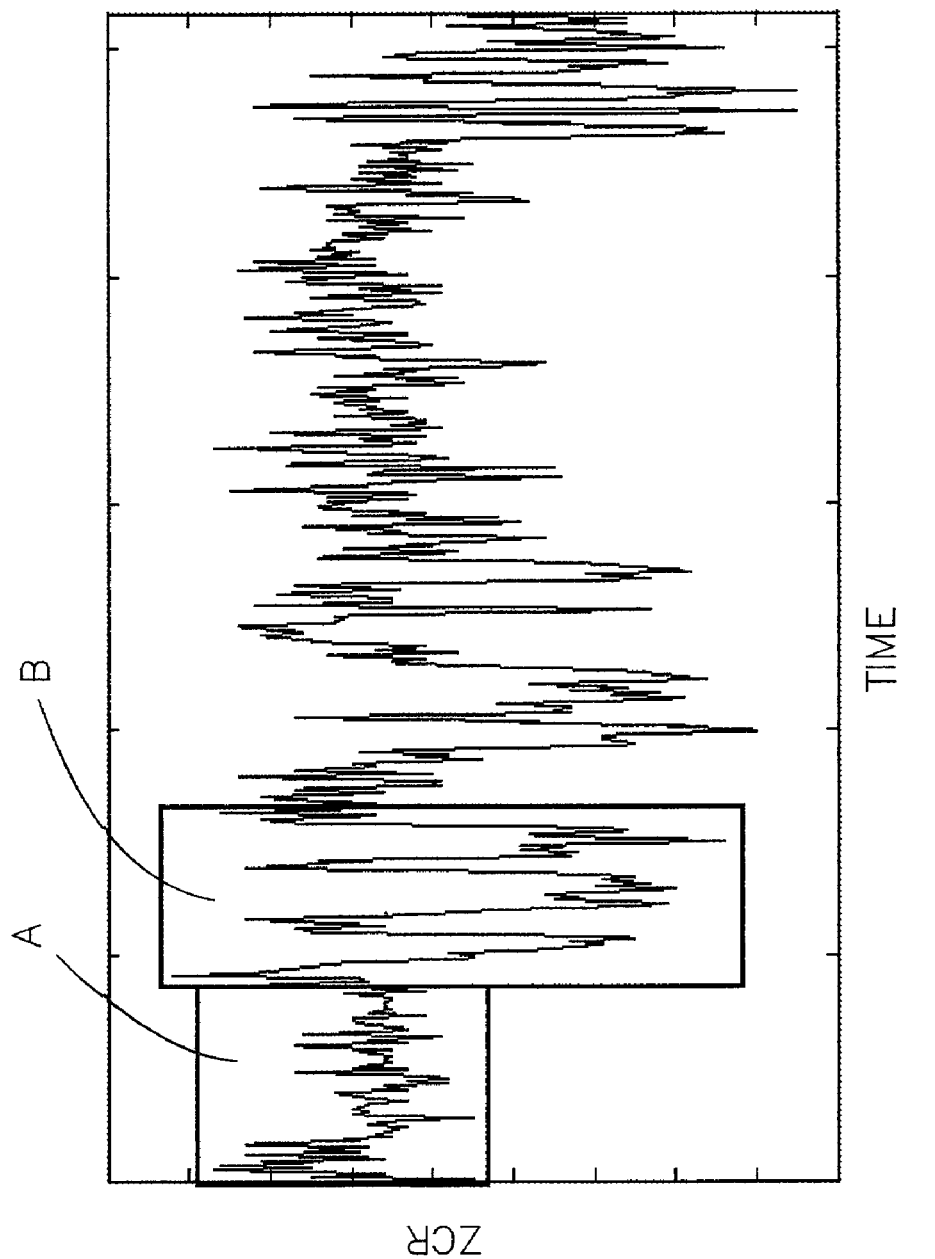
FIG. 11 is an average zero-crossing rate (ZCR) graph for the captured audio data of FIG. 9.

FIG. 11 is an average ZCR graph for the captured audio data of FIG. 9. By looking at the average ZCR, speech can be distinguished from the noise. Speech may be characterized as having a ZCR with a higher variance and amplitude span than other types of audio. This can be seen in the figure, where the first portion of the audio data (i.e., box A) exhibits much lower variance than the speech portion (i.e., box B).

Figure 12:
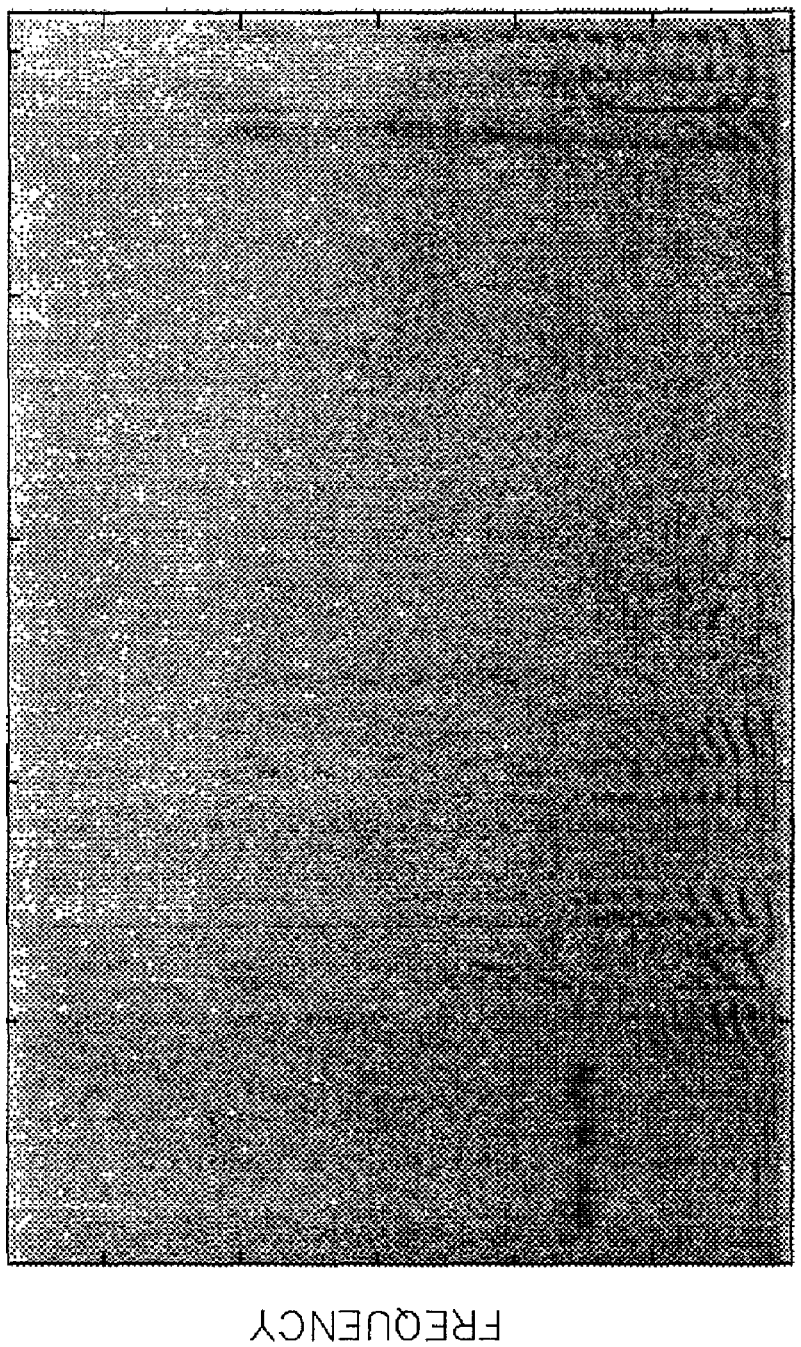
FIG. 12 is a spectrogram of the captured audio data of FIG. 9.

FIG. 12 is a spectrogram of the captured audio data of FIG. 9. Note the low frequency harmonics, similar to those in FIG. 7. The harmonics may be used for detecting speech, in conjunction with using the ZCR to reject noise.

Harmonic partials may be one data generated during the audio event detection (see FIG. 12 above). Therefore, the harmonic partials may be additionally used to distinguish between different speakers. As a result, the user may be able to choose a particular speaker and jump to the video scenes with that person talking.

In a music audio event detection embodiment, music is detected by detecting stable frequency peaks over time. The energy content of the audio data is measured and compared to the predetermined minimum energy threshold 136, as previously discussed. If the energy content exceeds the energy threshold, the frequency peaks within an audio time sample are obtained and compared to previous frequency peaks (i.e., compared to previous frequency spectrum values). The frequency peaks may be frequency spectrum values from predetermined audio frequency bands or from the entire audio spectrum. If the frequency peaks are substantially stable, i.e., they change no more than about 20 Hz to about 100 Hz, and preferably about 50 Hz, then music is detected (see FIGS. 13-16 and accompanying discussion below). If this is the first occurrence of music, then an audio event may be detected.

Figure 13:
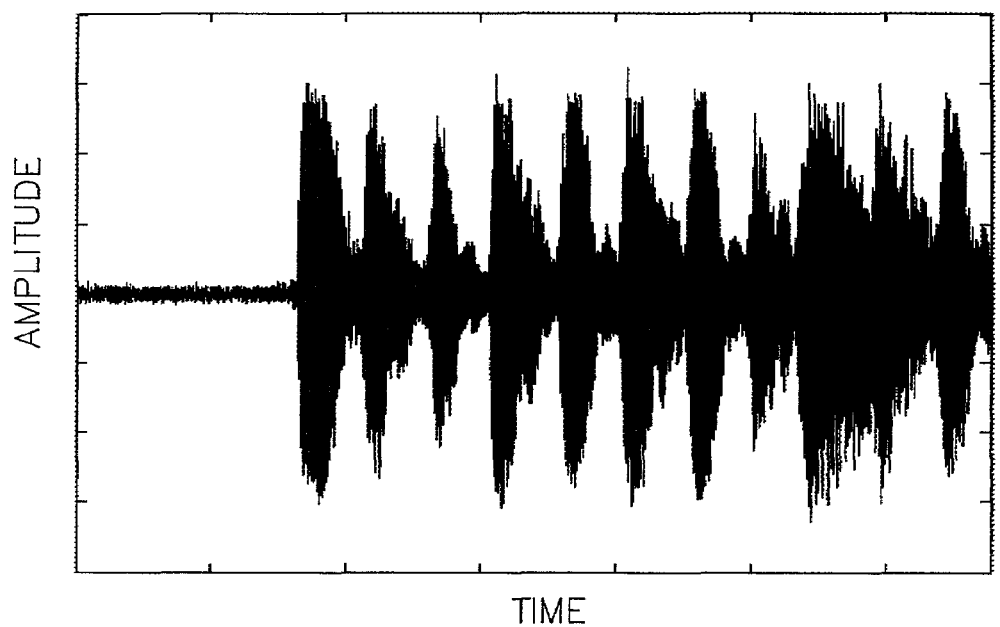
FIG. 13 is a time-domain waveform graph of yet another captured audio data.

FIG. 13 is a time-domain waveform graph of yet another captured audio data. The waveform of the graph includes music.

Figure 14:
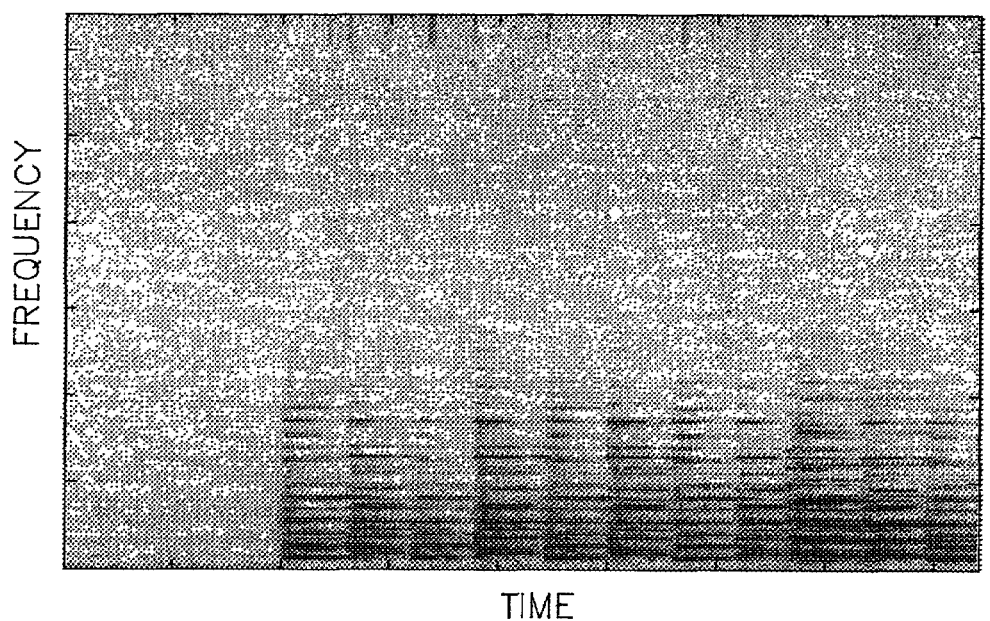
FIG. 14 is a spectrogram of the captured audio data of FIG. 13.

FIG. 14 is a spectrogram of the captured audio data of FIG. 13. The spectrogram contains a period of low-level noise, followed by sound from a piano. From this figure the temporal range and harmonic partials of each note can be seen (there are 11 notes total). The harmonic partials are stable peaks at certain frequencies during the duration of a music note. Therefore, the spectrum of the audio data may be periodically computed and checked to see whether there are stable frequency peaks in consecutive spectra. Stable frequency peaks may be detected in spite of the high noise level.

Figure 15:
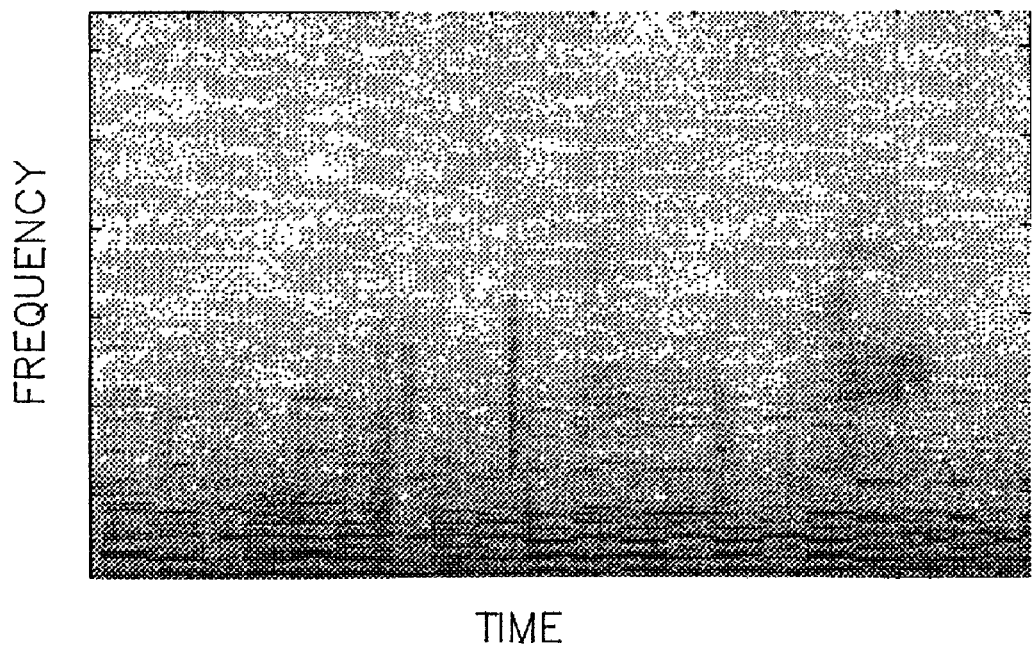
FIG. 15 is a spectrogram of yet another captured audio data containing noise and music.

FIG. 15 is a spectrogram of yet another captured audio data containing noise and music. The audio clip in this figure was extracted from a home video scene of people playing a video game in a family room and there is music from the video game present in the audio data. Stable frequency lines can be seen in this graph, indicating music components.

Figure 16:
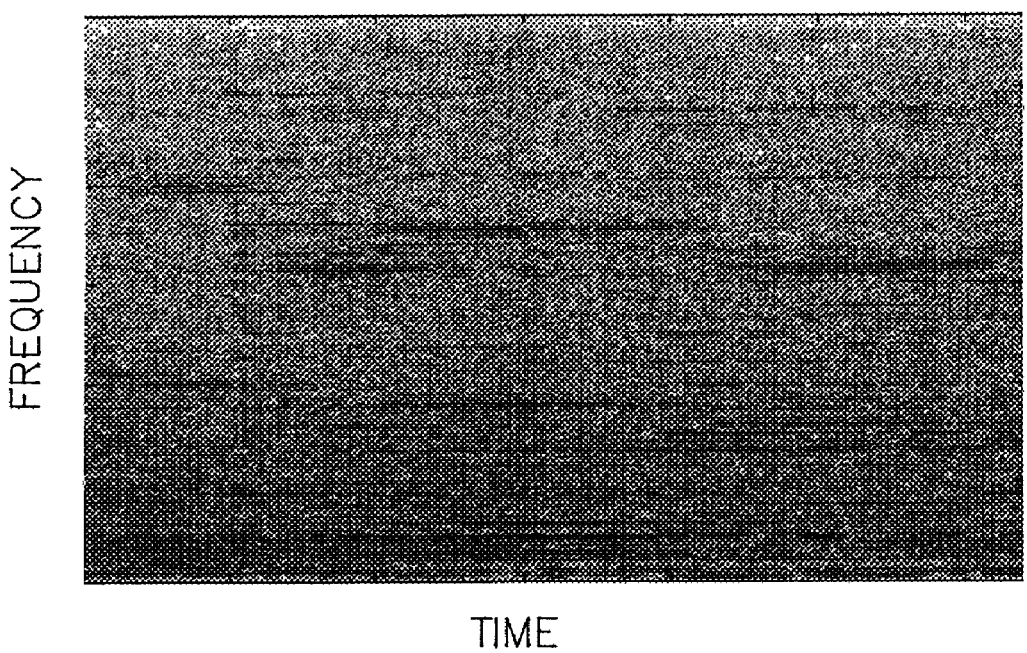
FIG. 16 is a spectrogram of yet another captured audio data containing very strong noise and music.

FIG. 16 is a spectrogram of yet another captured audio data containing very strong noise and music. The audio clip in this figure was extracted from a video taken on the street where there was music playing.

In both FIG. 15 and FIG. 16, the music is mixed with high level noise and the harmonic partials in the music cannot be clearly observed, unlike in FIG. 14. However, stable frequency peaks (which are characteristic of music signals) can still be seen as horizontal lines in the spectrograms (i.e., they have a stable frequency content over at least a period of time). These stable frequency lines indicate music components within high level noise. The above two figures therefore show that both music in the background or music with heavy noise can be detected according to the invention.

Video segmenting and indexing according to the invention may be applied to any video processing device. Therefore, the video processing device 100 may be any type of electronic device capable of processing video data, including video recorder devices, video editor devices, video authoring devices, and combinations thereof. The video segmenting according to the invention is especially applicable to any video processing device that uses magnetic tape video storage, although it may be employed in devices having solid-state memory, memory disc, writable optical memory, etc.

The present invention provides several benefits. It makes video browsing and editing fast and easy. Video segmenting and indexing according to the invention does not require expensive video processing equipment. Moreover, the invention may be used to create video indexes and representative frames for each shot or for each semantically meaningful scene in a video.

The invention differs from the prior art in that the invention may detect and index video shots or semantically meaningful video scenes. The invention does not work solely on the basis of shot detection, and detects audio events in order to index the video. Moreover, the video segmenting and indexing according to the invention may be used to segment and index home video, which may be noisy and irregular.

I claim:

1. A video processing device, comprising:
   an audio event detecting means for detecting audio events in a video data; and
   a memory communicating with said audio event detecting means and storing video data and audio data corresponding to said video data, said memory further storing a predetermined energy threshold, a predetermined ZCR variance threshold, and a predetermined ZCR amplitude span threshold;
   wherein said audio event detecting means includes an energy detector, which detects an audio event in said audio data by measuring an energy content of said audio data and indexes said video data at about a beginning of said audio event and, wherein said audio event detecting means further includes a ZCR detector generating a ZCR value from said audio data and comparing a ZCR variance and a ZCR value span of said audio data to the predetermined ZCR variance threshold and to said predetermined ZCR amplitude span threshold, respectively, if said energy content satisfies said predetermined energy threshold.

2. The device of claim 1, wherein said audio event detecting means indexes said video data by extracting and storing one or more representative video frames.

3. The device of claim 1 wherein said audio event detecting means indexes said video data by inserting index data into said video data.

4. The device of claim 1, wherein said audio event detecting means indexes said video data by saving one or more index pointers.

5. The device of claim 1, wherein said audio event detecting means indexes said video data by recording one or more time stamps.

6. The device of claim 1, wherein said audio event comprises speech.

7. The device of claim 1, wherein said audio event comprises music.

8. The device of claim 1, wherein said video processing device comprises a video recorder device.

9. The device of claim 1, wherein said video processing device comprises a video editor device.

10. The device of claim 1, wherein said video processing device comprises a video authoring device.

11. A video processing device, comprising:
    a processor;
    an audio event detector communicating with said processor, wherein said audio event detector includes an energy detector communicating with said processor and a ZCR detector communicating with said processor; and
    a memory communicating with said processor, said memory storing video data and audio data corresponding to said video data; said memory further storing a predetermined energy threshold, a predetermined ZCR amplitude span threshold, and a predetermined ZCR variance threshold;
    wherein said audio event detector detects an audio event in said audio data by measuring an energy content of said audio data, generating a ZCR value from said audio data, and comparing a ZCR variance and ZCR value span of said audio data to the predetermined ZCR variance threshold and to the predetermined ZCR amplitude span threshold, respectively, if said energy content satisfies said predetermined energy threshold and wherein said processor indexes said video data at about a beginning of said audio event.

12. The device of claim 11, wherein said video processing device comprises a video recorder device.

13. The device of claim 11, wherein said video processing device comprises a video editor device.

14. The device of claim 11, wherein said video processing device comprises a video authoring device.

15. The device of claim 11, wherein said processor indexes said video data by extracting and storing one or more representative video frames.

16. The device of claim 11, wherein said processor indexes said video data by inserting index darn into said video data.

17. The device of claim 11, wherein said processor Indexes said video data by saving one or more Index pointers.

18. The device of claim 11, wherein said processor Indexes said video data by recording one or more time stamps.

19. The device of claim 11, wherein said memory stores a predetermined set of speech harmonics thresholds, and wherein said audio event detector further comprises:
    a spectrum detector communicating with said processor and generating a frequency spectrum from said audio data;
    wherein said audio event detector compares harmonic frequency components in said frequency Spectrum to said predetermined set of speech harmonies thresholds and detects a speech audio event if said harmonic frequency components fall within said predetermined set of speech harmonics thresholds if said ZCR value span satisfies said predetermined ZCR amplitude spun threshold, if a variance between said ZCR value and one or more previous ZCR values satisfies the predetermined ZCR variance threshold, and if said energy content satisfies than said predetermined energy threshold.

20. The device of claim 19, wherein said spectrum detector comprises an FFT processor.

21. The device of claim 11, wherein said memory stores a predetermined frequency change threshold and wherein said audio event detector further comprises:
    a spectrum detector communicating with said processor and generating a frequency spectrum from said audio data;
    a peak detector communicating with said processor and said spectrum detector, said peak detector receiving said frequency spectrum, detecting frequency peaks in said frequency spectrum and generating a frequency peak output; and
    wherein said audio event detector compares frequency peaks in two or more frequency peak outputs and detects a music audio event if said frequency peaks in said two or more frequency peak outputs are substantially stable and if said energy content is greater than said predetermined energy threshold.

22. The device of claim 21, wherein said spectrum detector comprises an FFT processor.

23. The device of claim 21, wherein said music detector compares frequency peaks in two or more consecutive frequency peak outputs.

24. A method of indexing a video data, comprising the steps of:
    detecting an audio event in an audio data corresponding to said video data by
       comparing an energy content of said audio data to a predetermined energy threshold and comparing a ZCR variance and a ZCR value span of said audio data to a predetermined ZCR variance threshold and to a predetermined ZCR amplitude span threshold respectively, if said energy content satisfies said predetermined enemy threshold; and indexing one or more representative video frames of said video data at about a beginning or said audio event.

25. The method of claim 24, with the step of detecting said audio event further comprising detecting a speech audio event in said audio data.

26. The method of claim 24, with the step of detecting said audio event further comprising the steps of:

comparing harmonic frequency components of said audio data to a predetermined set of speech harmonics thresholds if said ZCR variance and said ZCR value span satisfies said predetermined ZCR variance threshold and said predetermined ZCR amplitude span threshold, respectively; and detecting a speech audio event if said harmonic frequency components are within said predetermined speech harmonics range.

27. The method of claim 24, with the step of detecting said audio event further comprising detecting a music audio event in said audio data.

28. The method of claim 24, with the step of detecting said audio event further comprising the steps of:

comparing frequency peaks in two or more consecutive frequency spectra if said energy content is greater than said predetermined energy threshold; and detecting a music audio event if said frequency peaks in said two or more consecutive frequency spectra are substantially stable.

29. The method of claim 24, with the step of indexing further comprising indexing said video data at about a beginning of a semantically meaningful video scene.

30. The method of claim 24, with the step of indexing further comprising extracting and storing said one or more representative video frames.

31. The method of claim 24, with the step of indexing further comprising inserting index data into said video data.

32. The method of claim 24, with the step of indexing further comprising saving one or more index pointers.

33. The method of claim 24, with the step of indexing further comprising storing one or more time stamps.

* * * * *

UNITED STATES PATENT AND TRADEMARK OFFICE
CERTIFICATE OF CORRECTION

PATENT NO. : 7,386,217 B2
APPLICATION NO. : 10/020256
DATED : June 10, 2008
INVENTOR(S) : Tong Zhang It is certified that error appears in the above-identified patent and that said Letters Patent is hereby corrected as shown below:

In column 15, line 17, in Claim 1, insert -- for -- before "generating".

In column 15, line 26, in Claim 3, after "claim 1" insert -- , --.

In column 15, line 54, in Claim 11, delete "data;" and insert -- data, --, therefor.

In column 15, line 61, in Claim 11, after "variance and" insert -- a --.

In column 15, line 65, in Claim 11, delete "threshold" and insert -- threshold, --, therefor.

In column 16, line 11, in Claim 16, delete "darn" and insert -- data --, therefor.

In column 16, line 14, in Claim 17, delete "Indexes" and insert -- indexes --, therefor.

In column 16, line 14, in Claim 17, delete "Index" and insert -- index --, therefor.

In column 16, line 17, in Claim 18, delete "Indexes" and insert -- indexes --, therefor.

In column 16, line 27, in Claim 19, delete "Spectrum" and insert -- spectrum --, therefor.

In column 16, line 28, in Claim 19, delete "harmonies" and insert -- harmonics --, therefor.

In column 16, line 32, in Claim 19, delete "spun" and insert -- span --, therefor.

In column 16, line 36, in Claim 19, after "satisfies" delete "than".

UNITED STATES PATENT AND TRADEMARK OFFICE
CERTIFICATE OF CORRECTION

PATENT NO. : 7,386,217 B2
APPLICATION NO. : 10/020256
DATED : June 10, 2008
INVENTOR(S) : Tong Zhang It is certified that error appears in the above-identified patent and that said Letters Patent is hereby corrected as shown below:

In column 17, line 4, in Claim 24, after "threshold" insert -- , --.

In column 17, line 5, in Claim 24, delete "enemy" and insert -- energy --, therefor.

In column 17, line 7, in Claim 24, delete "or" and insert -- of --, therefor.

Signed and Sealed this

Thirteenth Day of January, 2009

JON W. DUDAS
*Director of the United States Patent and Trademark Office*